United States Patent
Oliver

(10) Patent No.: US 8,893,286 B1
(45) Date of Patent: Nov. 18, 2014

(54) SYSTEMS AND METHODS FOR PREVENTING FRAUDULENT ACTIVITY ASSOCIATED WITH TYPO-SQUATTING PROCEDURES

(75) Inventor: Ian Oliver, Manly Vale (AU)

(73) Assignee: Symantec Corporation, Mountain View, CA (US)

( * ) Notice: Subject to any disclaimer, the term of this patent is extended or adjusted under 35 U.S.C. 154(b) by 320 days.

(21) Appl. No.: 13/083,214

(22) Filed: Apr. 8, 2011

(51) Int. Cl.
*G06F 21/60* (2013.01)

(52) U.S. Cl.
USPC .................... 726/26; 726/22; 726/24; 726/27

(58) Field of Classification Search
USPC .......................................................... 726/26
See application file for complete search history.

(56) References Cited

U.S. PATENT DOCUMENTS

| | | | |
|---|---|---|---|
| 8,468,597 B1 * | 6/2013 | Warner et al. ................... | 726/22 |
| 2006/0101514 A1 * | 5/2006 | Milener et al. .................. | 726/22 |
| 2007/0192855 A1 * | 8/2007 | Hulten et al. .................... | 726/22 |
| 2007/0245422 A1 * | 10/2007 | Hwang et al. .................... | 726/26 |
| 2008/0034073 A1 * | 2/2008 | McCloy et al. ................. | 709/223 |
| 2008/0092242 A1 * | 4/2008 | Rowley ............................ | 726/27 |
| 2008/0163369 A1 * | 7/2008 | Chang et al. ..................... | 726/22 |
| 2008/0250159 A1 * | 10/2008 | Wang et al. ..................... | 709/239 |
| 2009/0157675 A1 * | 6/2009 | Stellhorn et al. .................. | 707/6 |
| 2009/0182818 A1 * | 7/2009 | Krywaniuk ..................... | 709/206 |
| 2010/0095377 A1 * | 4/2010 | Krywaniuk ...................... | 726/22 |
| 2011/0055922 A1 * | 3/2011 | Cohen et al. ..................... | 726/22 |
| 2012/0096553 A1 * | 4/2012 | Srivastava et al. ............... | 726/24 |

\* cited by examiner

*Primary Examiner* — Kambiz Zand
*Assistant Examiner* — Yonas Bayou
(74) *Attorney, Agent, or Firm* — Holland & Hart LLP

(57) ABSTRACT

A computer-implemented method to prevent fraudulent activity associated with typo-squatting procedures is described. An input of a uniform resource locator (URL) for a un-assessed website is detected. A data field on the un-assessed website for sensitive information is detected. The inputted URL is compared to a database of URLs for trusted websites associated with trusted entities. A determination is made as to whether a difference between the inputted URL and the URLs in the database satisfies a threshold. Upon determining that the difference satisfies the threshold, a message regarding the un-assessed website is generated.

18 Claims, 8 Drawing Sheets

SYSTEMS AND METHODS FOR PREVENTING FRAUDULENT ACTIVITY ASSOCIATED WITH TYPO-SQUATTING PROCEDURES

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand an increase in the efficiency of these technologies. Improving the efficiency of computer technologies is always desirable to anyone who uses and relies on computers.

Many computing systems are part of the Internet. Computers that are part of the Internet may access a vast range of information resources and services. The Internet may include a hardware and software infrastructure that provides connectivity between numerous computers. The Internet allows greater flexibility in working hours and location.

The World Wide Web may be accessed via the Internet. The World Wide Web is a global set of documents, images and other resources, logically interrelated by hyperlinks and referenced with Uniform Resource Locators (URLs). URLs allow providers to symbolically identify services and clients to locate and address web servers, file servers, and other databases that store documents and provide resources and access them using the Hypertext Transfer Protocol (HTTP), the primary carrier protocol of the World Wide Web. In some instances, a user may input an incorrect URL for a particular website. A fraudulent website may be accessed that is similar in appearance and includes similar content as the intended website. As a result, the user may be deceived in believing that the fraudulent website is indeed the authentic, intended website. The fraudulent website may request information from the user that may then be used for fraudulent purposes. The user may offer this information voluntarily, believing that the intended website is being accessed. The process of accessing a non-authentic website that resembles an authentic website when an incorrect URL for the authentic website is provided may be referred to as typo-squatting.

SUMMARY

According to at least one embodiment, a computer-implemented method to prevent fraudulent activity associated with typo-squatting procedures is described. An input of a uniform resource locator (URL) for an un-assessed website is detected. A data field on the un-assessed website for sensitive information is detected. The inputted URL is compared to a database of URLs for trusted websites associated with trusted entities. A determination is made as to whether a difference between the inputted URL and the URLs in the database satisfies a threshold. Upon determining that the difference satisfies the threshold, a message regarding the un-assessed website is generated.

In one embodiment, information relating to a predetermined number of prior websites accessed prior to the un-assessed website is collected. The collected information relating to the predetermined number of prior websites may be compared to the database of URLs for trusted websites. A determination may be made as to whether a difference between the collected information relating to the predetermined number of prior websites and the URLs in the database satisfies a threshold. Upon determining that the difference between the collected information relating to the predetermined number of prior websites and the URLs in the database satisfies the threshold, a message regarding the un-assessed website may be generated. The message may be a warning message indicating that the un-assessed website is associated with an unknown entity. The message may be a warning message indicating that the prior websites are associated with one or more unknown entities.

In one configuration, the sensitive information may be a credit card account number. An input of the sensitive information into the data field on the un-assessed website may be detected. In one embodiment, a transmission of the inputted sensitive information across a network connection may be suspended.

A computing device configured to prevent fraudulent activity associated with typo-squatting procedures is also described. The computing device may include a processor and memory in electronic communication with the processor. The computing device may also include a domain analysis module configured to detect an input of a uniform resource locator (URL) for an un-assessed website, and detect a data field on the un-assessed website for sensitive information. The domain analysis module may be further configured to compare the inputted URL to a database of URLs for trusted websites associated with trusted entities, and determine whether a difference between the inputted URL and the URLs in the database satisfies a threshold. Upon determining that the difference satisfies the threshold, the domain analysis module may be configured to generate a message regarding the un-assessed website.

A computer-program product for preventing fraudulent activity associated with typo-squatting procedures is also described. The computer-program product may include a non-transitory computer-readable medium having instructions thereon. The instructions may include code programmed to detect an input of a uniform resource locator (URL) for an un-assessed website, and code programmed to detect a data field on the un-assessed website for sensitive information. The instructions may further include code programmed to compare the inputted URL to a database of URLs for trusted websites associated with trusted entities, and code programmed to determine whether a difference between the inputted URL and the URLs in the database satisfies a threshold. Upon determining that the difference satisfies the threshold, the instructions may include code programmed to generate a message regarding the un-assessed website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
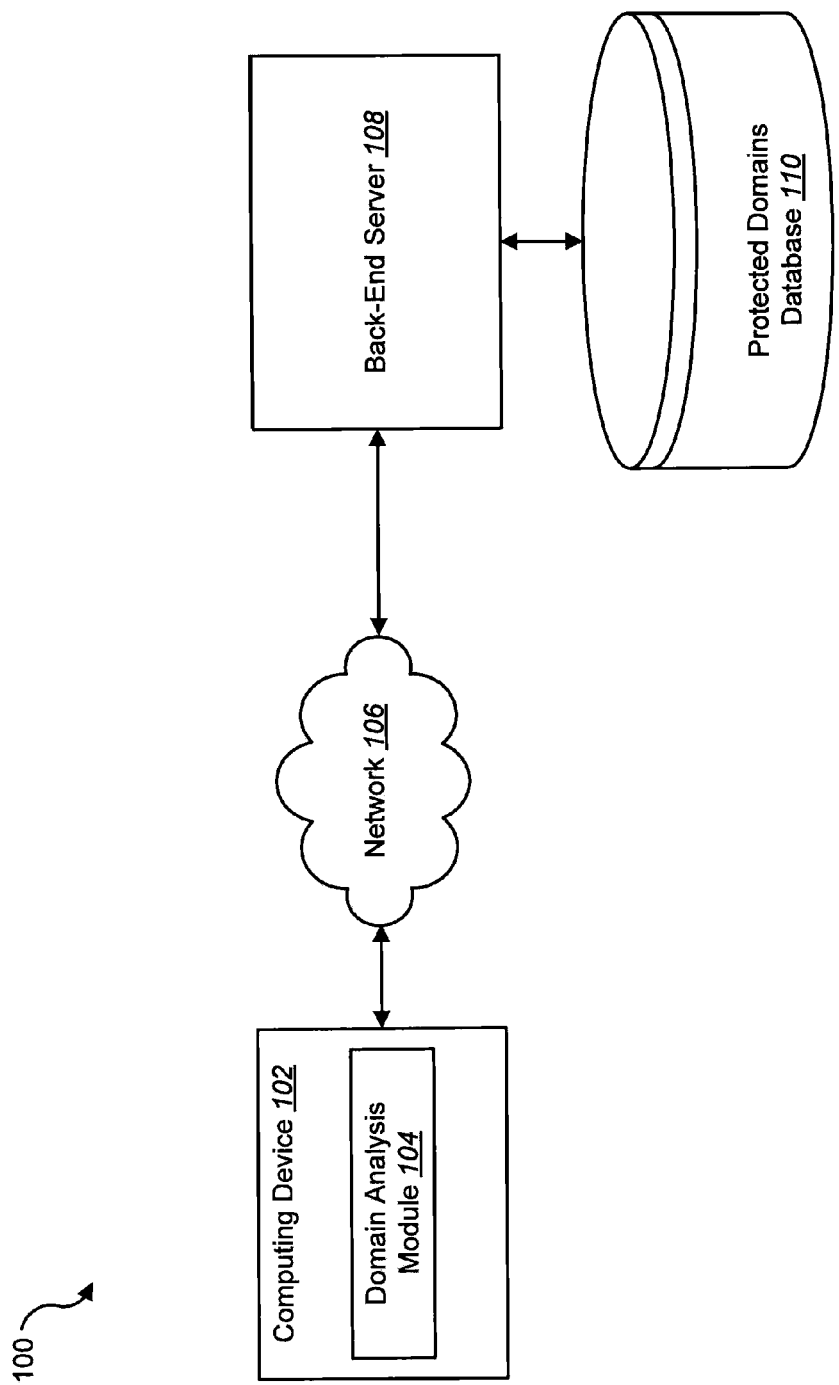
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Typo-squatting (also referred to as Uniform Resource Locator (URL) hijacking), may be a form of cybersquatting. Typo-squatting may rely on mistakes, such as typographical errors, made by users when inputting a website address into a web browser. When a user accidentally enters an incorrect website address, the web browser may be led to an alternative website owned by a cybersquatter. The alternative website may resemble the intended website in order to confuse the user. For example, the alternative website may include logos that are similar (or copied) logos included on the intended website. In addition, the alternative website may have a similar layout and content as the intended website. As a result, the user may believe that the alternative website is actually the intended website. The user may be requested to provide sensitive information (e.g., bank account information, passwords, and the like) on the alternative website. The user may provide this information on the alternative website, believing that the website is the intended website. The operator of the alternative website may then fraudulently use the sensitive information provided by the user. It is, however, difficult to accurately and consistently identify content on the alternative website that would identify the website as an imposter website.

FIG. 1 is a block diagram illustrating one embodiment of an environment 100 in which the present systems and methods may be implemented. In one configuration, a computing device 102 may communicate with a back-end server 108 across a network 106 connection. The computing device 102 may be a personal computer (PC), a laptop, a tablet, a smartphone, a personal digital assistant (PDA), or any other type of computing device.

In one example, the back-end server 108 may communicate with a protected domains database 110. The database 110 may include a list of domains of websites. The domains included in the database 110 may be domains that are to be protected against typo-squatting procedures. For example, the database 110 may include a list of domains associated with websites of legitimate institutions (e.g., banking institutions, education institutions, and the like).

The computing device 102 may include a domain analysis module 104. The module 104 may analyze various characteristics of websites. For example, the module 104 may analyze a domain name of a website. The module 104 may also analyze content included on a website. Details regarding the domain analysis module 104 will be discussed below.

Figure 2:
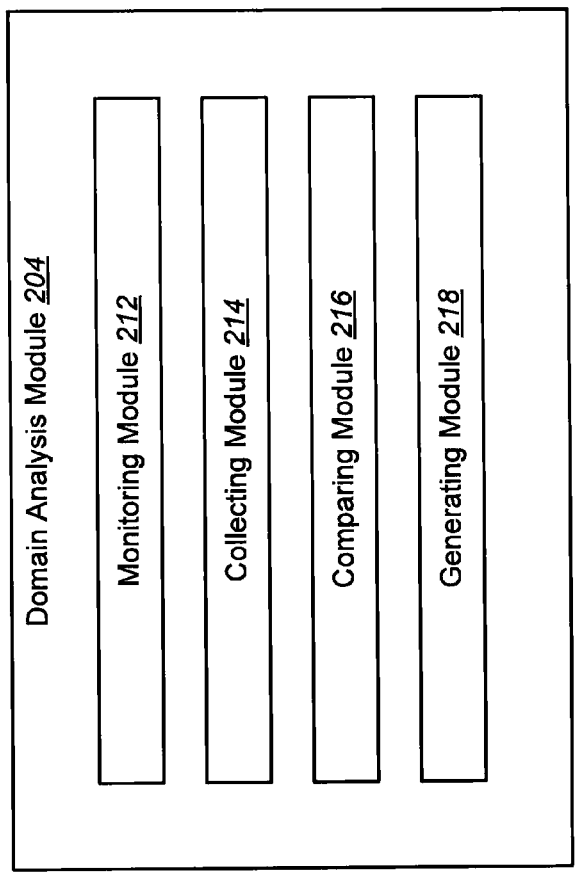
FIG. 2 is a block diagram illustrating one embodiment of a domain analysis module.

FIG. 2 is a block diagram illustrating one embodiment of a domain analysis module 204. The module 204 may include a monitoring module 212, a collecting module 214, a comparing module 216, and a generating module 218. In one example, the monitoring module 212 may monitor a website. The monitoring module 212 may determine whether sensitive information is being requested to be inputted on the website. The monitoring module 212 may further detect whether information that may be a credit card number, a bank account number, an email address, or a password is entered into a data field on the website.

In one example, the collecting module 214 may collect information regarding the website that is requesting (or has received as input) sensitive information. For example, the collecting module 214 may collect the URL of the website. The comparing module 216 may compare the collected URL to URLs stored in the protected domains database 110. The generating module 218 may generate a message based on the results of the comparison. In one embodiment, the generating module 218 may generate a warning message to a user when the URL of the website is a variation or modification of a URL stored in the database 110. The generating module 218 may also generate a warning message to the user if the URL of the website is not included among the URLs stored in the database 110. In one example, the comparing module 216 may compare one or more characters of the URL of the website with URL characters stored in the database 110. Algorithms may be used to determine the amount of difference (if any) between characters of the URL for the website and the characters of the URLs stored in the database 110. When the difference between the characters of the website URL and the characters of the URLs stored in the database 110 satisfies a certain threshold, the generating module 218 may generate a message to the use regarding the difference.

In one configuration, the collecting module 214 may collect information regarding websites that were accessed prior to the current website. For example, the monitoring module 212 may detect a request for (or an actual input of) sensitive information on a current website. The collecting module 216 may collect information regarding websites that may have been accessed prior to the current website being accessed. The comparing module 216 may compare characteristics of previously accessed websites with characteristics of websites stored in the protected domains database 110. For example, the collecting module 214 may collect URLs of websites that were accessed prior to the current website. The comparing module 216 may compare the collected URLs to URLs stored in the protected domains database 110. The generating module 218 may generate a message based on the results of the comparison. For example, the generating module 218 may generate a warning message to a user when the comparing module 216 determines that a collected URL associated with a website accessed prior to the current website is a variation of a URL stored in the database 110.

Figure 3:
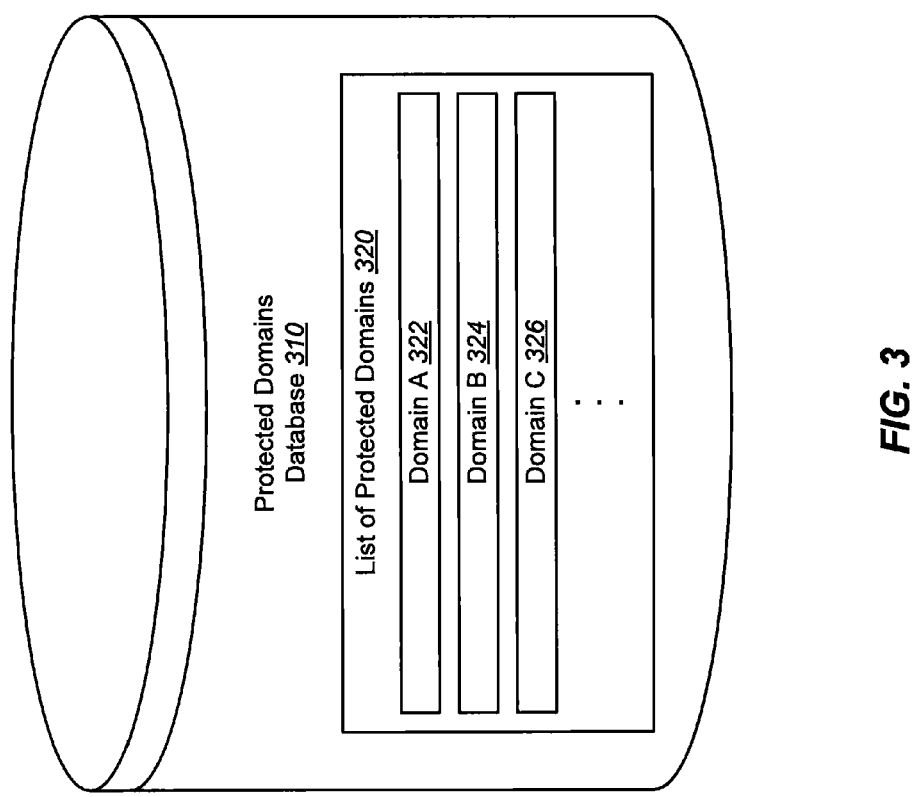
FIG. 3 is a block diagram illustrating one embodiment of a protected domains database that may be used with the present systems and methods.

FIG. 3 is a block diagram illustrating one embodiment of a protected domains database 310 that may be used with the present systems and methods. The database 310 may store a list of protected domains 320. The list 320 may include URLs of certain entities desired to be protected against typo-squatting procedures. For example, a banking institution may provide the URL of their website. This may be stored in the database 310 as domain A 322. A credit card company may also provide the URL of their website to be stored in the database 310 as domain B 324. While only three domains 322, 324, 326 are included on the list of protected domains 320, the list 320 may include more or less than three domains.

Figure 4:
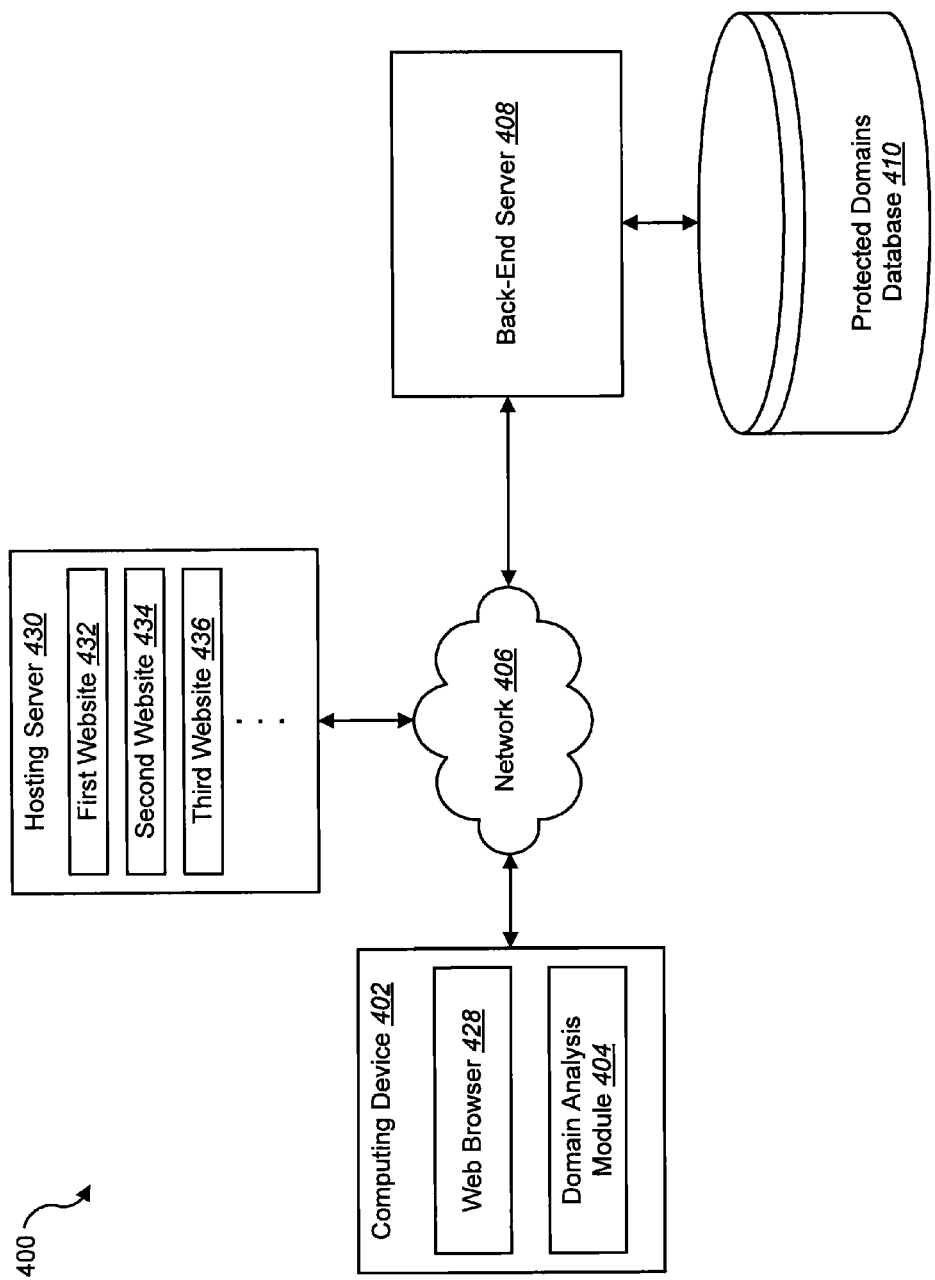
FIG. 4 is a block diagram illustrating one embodiment of an environment in which the present systems and methods may be implemented.

FIG. 4 is a block diagram illustrating one embodiment of an environment 400 in which the present systems and methods may be implemented. In one configuration, a computing device 402 may communicate with a back-end server 408 and a hosting server 430. The back-end server 408 may communicate with a protected domains database 410, as previously described.

In one example, the computing device 402 may include a web browser 428 that may access and display websites 432, 434, 436 stored on the hosting server 430. A domain analysis module 404 executing on the computing device 402 may monitor the websites 432, 434, 436 displayed via the web browser 428. If the domain analysis module 404 detects the input of sensitive information into a website, the module 404 may collect information regarding the websites previously displayed via the web browser 428. The collected information may be compared to information stored in the protected domains database 410.

In one configuration, the web browser 428 may access and display a first website 432. The web browser 428 may then access a second website 434 subsequent to accessing the first website 432. In one example, the web browser 428 may access and display a third website 436 subsequent to accessing and displaying the second website 434. The third website 436 may include data fields that request a user to input sensitive information (e.g., credit card number, bank account, etc.). The domain analysis module 404 may detect that sensitive information is being requested by (or has been inputted to) the third website 436. The domain analysis module 404 may collect information regarding the third website 436, such as, but not limited to, the URL of the third website 436, the title of the third website 436, the content on the third website 436, and the like. The module 404 may compare the information collected about the third website 436 to information stored in the protected domains database 410. The module 404 may generate a message based on the results of the comparison. For example, if the information collected about the third website 436 does not match information stored in the database 410, the module 404 may generate a warning message indicating that the third website 436 may not be associated with a legitimate entity.

In another embodiment, if the domain analysis module 404 detects the presence (or request) of sensitive information on the third website 436, the module 404 may collect information about a certain number of websites accessed prior to the access of the third website 436. In this example, the module 404 may collect information regarding the first website 432 and the second website 434. The module 404 may compare the information collected about the first website 432 and the second website 434 to the information stored in the database 410. The module may generate a message based on the results of the comparison.

A user may attempt to access a legitimate website, but may mistype the URL of the legitimate website. As a result, the user may be directed to the first website 432 that resembles the legitimate website. The first website 432 may not actually request or accept sensitive information. Instead, the first website 432 may include a link that causes the web browser 428 to access the second website 434. The second website 434 may request or receive sensitive information. In addition, the URL of the second website 434 may be included in the database 410. The sensitive information inputted on the second website 434 may be a credit card number or bank account information. The second website 434 may serve as a payment center for items or services offered on the first website 432. As a result, the operators of the fraudulent first website 432 (which the user mistakenly accessed by misspelling the URL of the legitimate website) may receive funds or other payments provided by the user on the legitimate second website 434. To prevent this practice, the domain analysis module 404 may not only compare information about the second website 434 to the information stored in the database 410, but the module 404 may also collect information about websites displayed prior to the website that is requesting or receiving the sensitive information. In this example, the module 404 may also collect information about the first website 432. The collected information about the first website 432 may be compared to information stored in the database 410. The module 404 may generate a message to the user based on the results of the comparison. For example, if the information about the first website 432 does not match the information stored in the database 410, the user may receive a message indicating that the payment about to be processed via the second website 434 may originate from a fraudulent website (e.g., the first website 432). The user may then either proceed with the payment or cancel the transaction.

Figure 5:
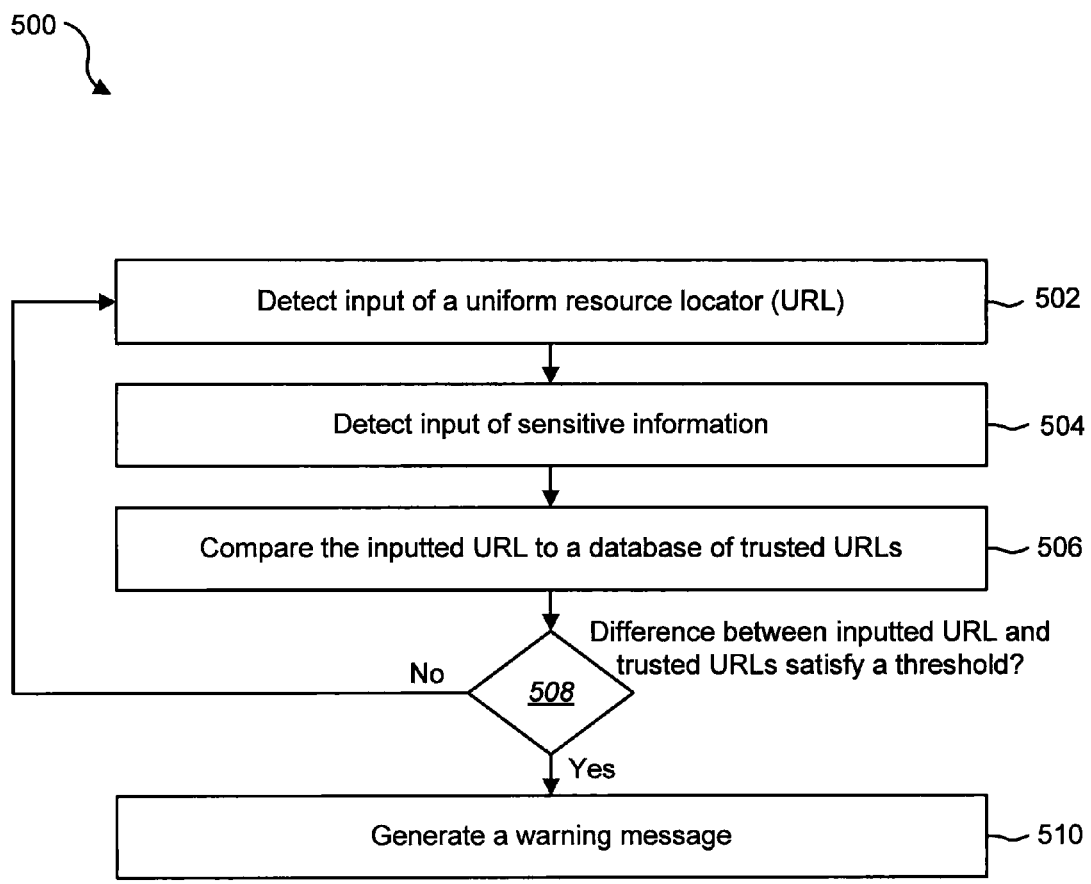
FIG. 5 is a flow diagram illustrating one embodiment of a method to prevent fraudulent activity caused by typo-squatting procedures.

FIG. 5 is a flow diagram illustrating one embodiment of a method 500 to prevent fraudulent activity caused by typo-squatting procedures. In one configuration, the method 500 may be implemented by the domain analysis module 104.

In one embodiment, input of a URL for a website may be detected 502. In addition, input of sensitive information on the website may also be detected 504. The transmission of the sensitive information may be suspended while the inputted URL is compared 506 to a database of trusted URLs. A determination 508 may be made as to whether a difference between the inputted URL and the trusted URLs satisfy a threshold. If it is determined 508 that the difference between the inputted URL and the trusted URLs stored in the database does not satisfy the threshold, the method 500 may return to detect 502 input of a URL and the sensitive information may be transmitted to a recipient across a network connection. If, however, it is determined 508 that the difference between the inputted URL and the trusted URLs does satisfy the threshold, a warning message may be generated 510. The warning message may indicate that the inputted URL may be related to a fraudulent website. In one configuration, the difference between the inputted URL and the trusted URLs may be determined by comparing characters of the inputted URL against characters of the trusted URLs. If a certain number of characters do not match, the threshold may be satisfied.

Figure 6:
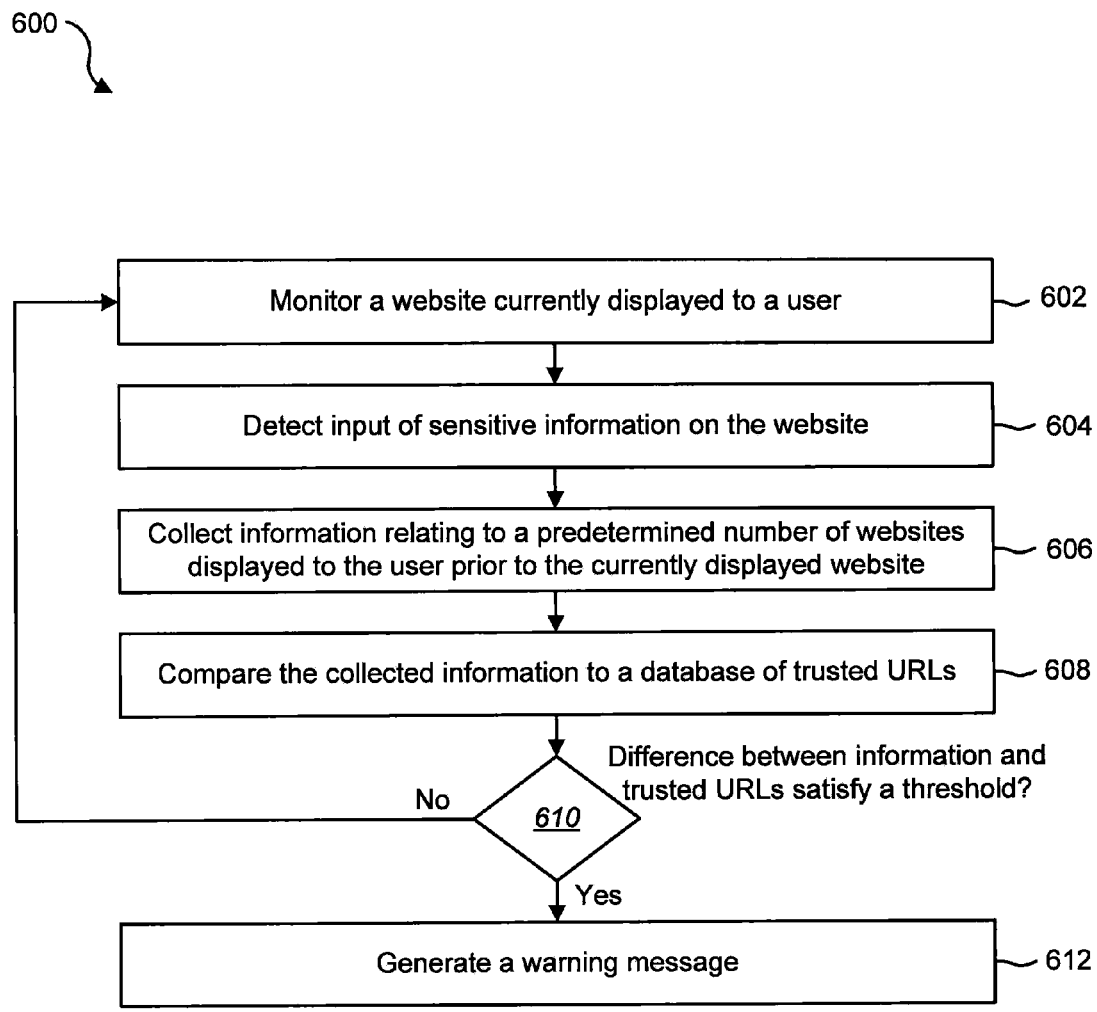
FIG. 6 is a flow diagram illustrating a further embodiment of a method to prevent fraudulent activity caused by typo-squatting procedures.

FIG. 6 is a flow diagram illustrating a further embodiment of a method 600 to prevent fraudulent activity caused by typo-squatting procedures. In one example, the method 600 may be implemented by the domain analysis module 104.

In one configuration, a website currently displayed to a user may be monitored 602. Input of sensitive information on the currently displayed website may be detected 604. Information relating to a predetermined number of websites displayed to the user prior to displaying the currently displayed website may be collected 606. The collected information may be compared 608 to a database of trusted URLs. In one configuration, a determination 610 may be made as to whether a difference between the collected information and information stored in the database satisfies a threshold. If it is determined 610 that the difference between the collected information and the information in the database does not satisfy the threshold, the method 600 may return to monitor 602 a website currently displayed to a user. If, however, it is determined 610 that the difference between the collected information and the information stored in the database does satisfy the threshold, a warning message may be generated 612. The message may indicate that a transaction occurring on the currently displayed website may be associated with a fraudulent website which was previously displayed to the user.

Figure 7:
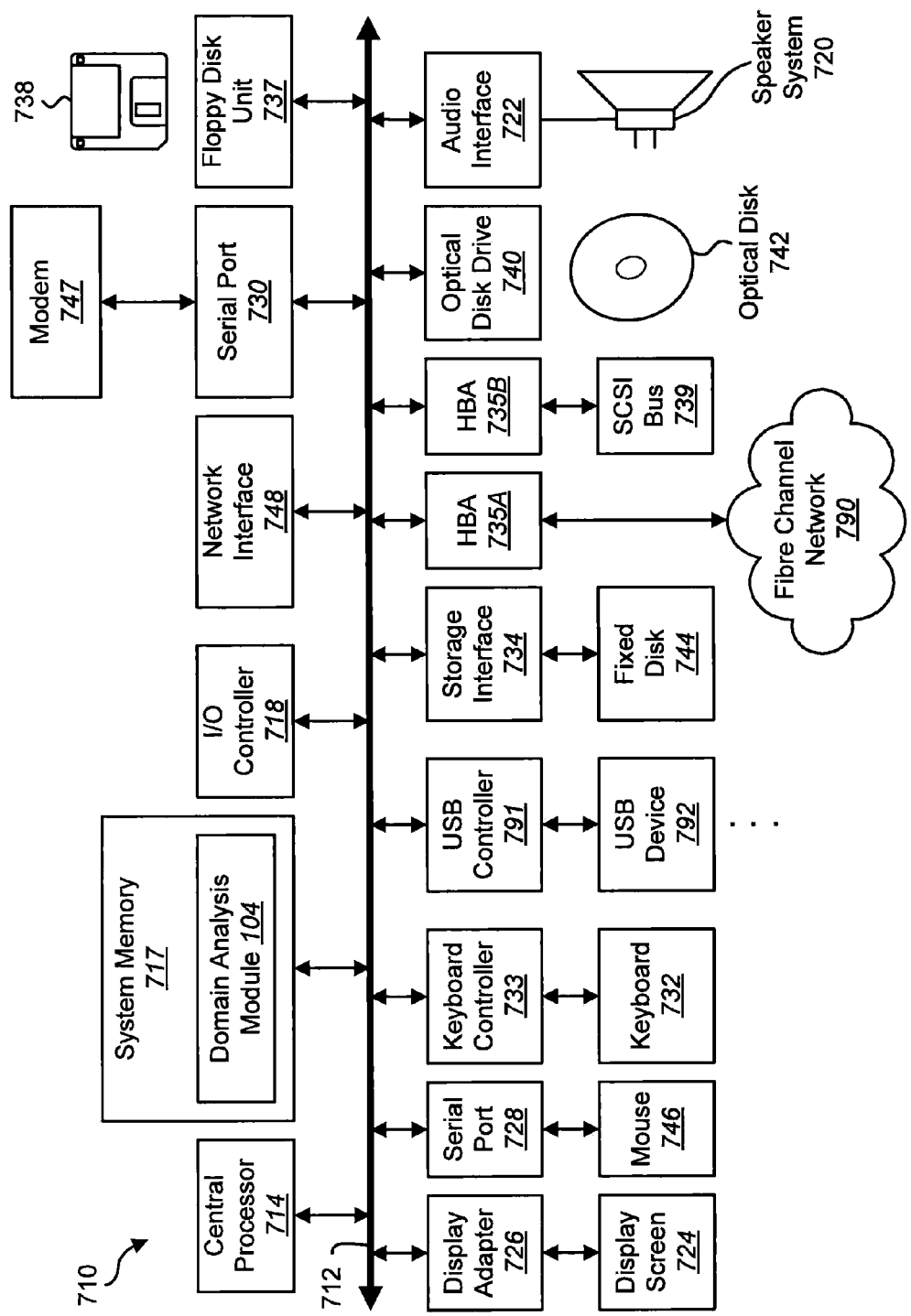
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 791), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the domain analysis module 104 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
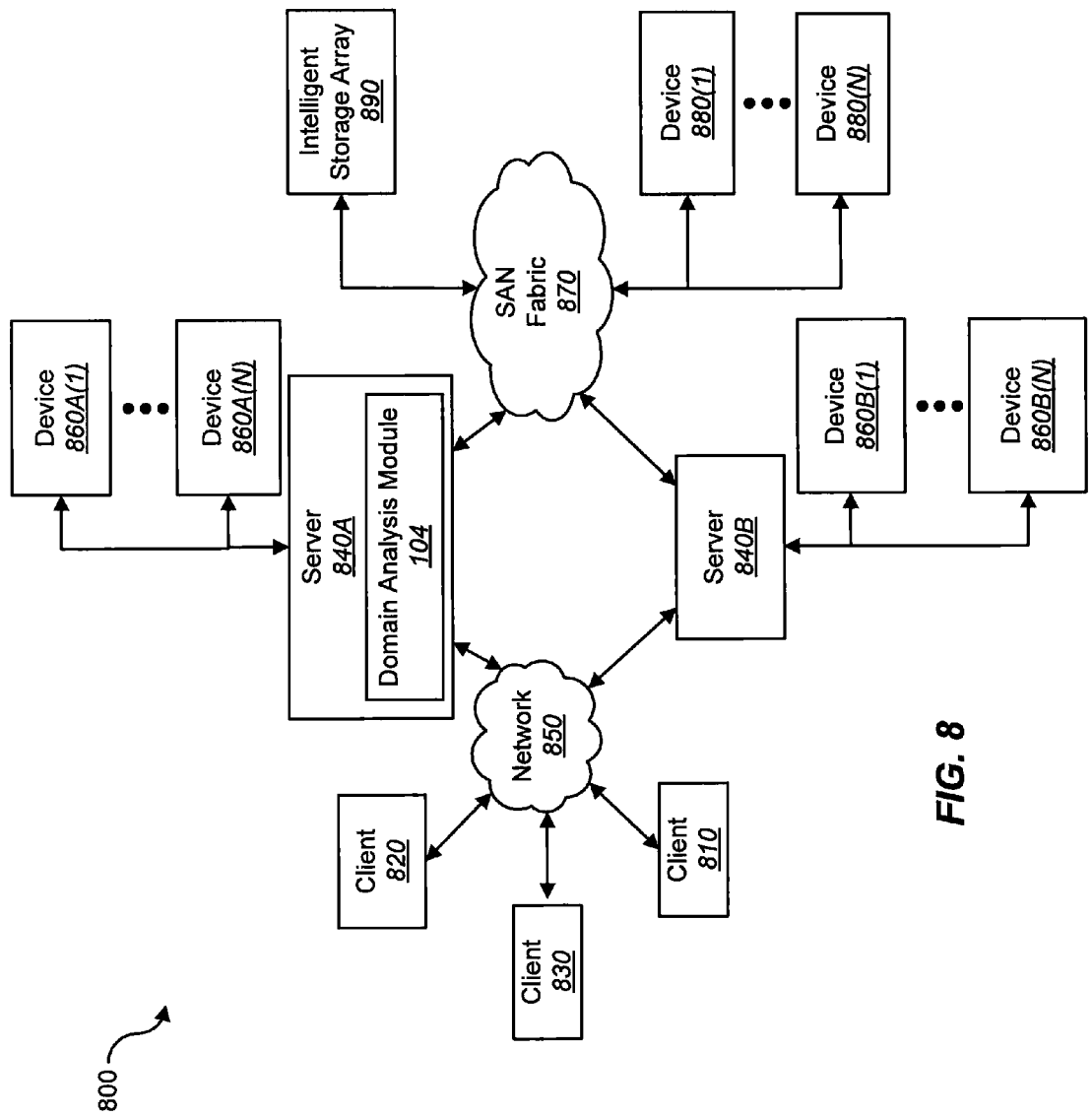
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A, 840B (any of which can be implemented using computer system 810), are coupled to a network 850. In one embodiment, the domain analysis module 104 may be located within the storage servers 840A, 840B to implement the present systems and methods. The storage server 840A is further depicted as having storage devices 860A (1)-(N) directly attached, and storage server 840B is depicted with storage devices 860B(1)-(N) directly attached. SAN fabric 870 supports access to storage devices 880(1)-(N) by storage servers 840A, 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to prevent fraudulent activity associated with typo-squatting procedures, comprising:
   detecting, by a processor of a computing device, an input of a uniform resource locator (URL) for an un-assessed website at a browser on the computing device;
   collecting, by the processor, information relating to a predetermined number of prior websites accessed at and displayed on the browser of the computing device prior to the URL of the un-assessed website being input at the browser on the computing device;
   detecting, by the processor, a data field on the un-assessed website for sensitive information;
   comparing, by the processor, the inputted URL to a database of URLs for trusted websites associated with trusted entities;
   determining, by the processor, whether a difference between the inputted URL and the URLs in the database satisfies a threshold;
   comparing, by the processor, the information relating to the predetermined number of prior websites to the database of URLs;
   determining, by the processor, whether the information relating to the predetermined number of prior websites includes a variation of a URL stored in the database of URLs;
   upon determining that the difference satisfies the threshold, generating, by the processor, a message regarding the un-assessed website; and
   upon determining that the information relating to the predetermined number of prior websites includes the variation of the URL stored in the database of URLs, including, by the processor, in the message information regarding the predetermined number of prior websites including the variation of the URL stored in the database of URLs.

2. The method of claim 1, further comprising comparing the collected information relating to the predetermined number of prior websites to the database of URLs for trusted websites.

3. The method of claim 2, further comprising determining whether a difference between the collected information relating to the predetermined number of prior websites and the URLs in the database satisfies a threshold.

4. The method of claim 3, wherein upon determining that the difference between the collected information relating to the predetermined number of prior websites and the URLs in the database satisfies the threshold, further comprising generating a message regarding the un-assessed website.

5. The method of claim 1, wherein the message comprises a warning message indicating that the un-assessed website is associated with an unknown entity.

6. The method of claim 4, wherein the message comprises a warning message indicating that the prior websites are associated with one or more unknown entities.

7. The method of claim 1, wherein the sensitive information comprises a credit card account number.

8. The method of claim 1, further comprising detecting an input of the sensitive information into the data field on the un-assessed website.

9. The method of claim 8, further comprising suspending a transmission of the inputted sensitive information across a network connection.

10. A computing device configured to prevent fraudulent activity associated with typo-squatting procedures, comprising:
    a processor;
    memory in electronic communication with the processor;
    instructions stored in the memory, the instructions being executable by the processor to:
       detect an input of a uniform resource locator (URL) for an un-assessed website at a browser on the computing device;
       collect information relating to a predetermined number of prior websites accessed at and displayed on the browser of the computing device prior to the URL of the un-assessed website being input at the browser on the computing device;

detect a data field on the un-assessed website for sensitive information;

compare the inputted URL to a database of URLs for trusted websites associated with trusted entities;

determine whether a difference between the inputted URL and the URLs in the database satisfies a threshold;

compare the information relating to the predetermined number of prior websites to the database of URLs;

determine whether the information relating to the predetermined number of prior websites includes a variation of a URL stored in the database of URLs;

upon determining that the difference satisfies the threshold, generate a message regarding the un-assessed website; and upon determining that the information relating to the predetermined number of prior websites includes the variation of the URL stored in the database of URLs, include in the message information regarding the predetermined number of prior websites including the variation of the URL stored in the database of URLs.

11. The computing device of claim 10, wherein the instructions are executable by the processor to:

compare the collected information relating to the predetermined number of prior websites to the database of URLs for trusted websites.

12. The computing device of claim 11, wherein the instructions are executable by the processor to:

determine whether a difference between the collected information relating to the predetermined number of prior websites and the URLs in the database satisfies a threshold.

13. The computing device of claim 12, wherein upon determining that the difference between the collected information relating to the predetermined number of prior websites and the URLs in the database satisfies the threshold, the instructions are executable by the processor to:

generate a message regarding the un-assessed website.

14. The computing device of claim 13, wherein the message comprises a warning message indicating that the prior websites are associated with one or more unknown entities.

15. The computing device of claim 10, wherein the message comprises a warning message indicating that the un-assessed website is associated with an unknown entity.

16. The computing device of claim 10, wherein the sensitive information comprises a credit card account number.

17. The computing device of claim 10, wherein the instructions are executable by the processor to:

detect an input of the sensitive information into the data field on the un-assessed website.

18. A computer-program product for preventing fraudulent activity associated with typo-squatting procedures, the computer-program product comprising a non-transitory computer-readable medium storing instructions thereon, the instructions being executable by the processor to:

detect an input of a uniform resource locator (URL) for an un-assessed website at a browser on a computing device;

collect information relating to a predetermined number of prior websites accessed at and displayed on the browser of the computing device prior to the URL of the un-assessed website being input at the browser on the computing device;

detect a data field on the un-assessed website for sensitive information;

compare the inputted URL to a database of URLs for trusted websites associated with trusted entities;

determine whether a difference between the inputted URL and the URLs in the database satisfies a threshold;

compare the information relating to the predetermined number of prior websites to the database of URLs;

determine whether the information relating to the predetermined number of prior websites includes a variation of a URL stored in the database of URLs;

upon determining that the difference satisfies the threshold, generate a message regarding the un-assessed website; and upon determining that the information relating to the predetermined number of prior websites includes the variation of the URL stored in the database of URLs, include in the message information regarding the predetermined number of prior websites including the variation of the URL stored in the database of URLs.

* * * * *